US009558399B1

(12) United States Patent
Jeka et al.

(10) Patent No.: US 9,558,399 B1
(45) Date of Patent: Jan. 31, 2017

(54) FEEDBACK DEVICE TO IMPROVE ARM SWING

(71) Applicants: John Joseph Jeka, Philadelphia, PA (US); Peter Igoche Agada, Philadelphia, PA (US); Bertec Corporation, Columbus, OH (US)

(72) Inventors: John Joseph Jeka, Philadelphia, PA (US); Peter Igoche Agada, Philadelphia, PA (US)

(73) Assignee: Bertec Corporation, Columbus, OH (US)

( * ) Notice: Subject to any disclaimer, the term of this patent is extended or adjusted under 35 U.S.C. 154(b) by 245 days.

(21) Appl. No.: 14/318,633

(22) Filed: Jun. 28, 2014

(51) Int. Cl.
*A63F 9/24* (2006.01)
*G06K 9/00* (2006.01)

(52) U.S. Cl.
CPC ................... *G06K 9/00355* (2013.01)

(58) Field of Classification Search
CPC ............ A63B 24/0062; A63B 2220/10; A63B 2220/836; G06K 9/00355
See application file for complete search history.

(56) References Cited

U.S. PATENT DOCUMENTS

| 6,836,744 | B1 | 12/2004 | Asphahani et al. | |
| 8,460,001 | B1* | 6/2013 | Chuang | G09B 19/0038 434/247 |
| 8,784,274 | B1* | 7/2014 | Chuang | G09B 19/0038 482/3 |
| 2005/0240375 | A1* | 10/2005 | Sugai | G01P 3/50 702/160 |
| 2011/0153042 | A1* | 6/2011 | Burton | A63B 24/0062 700/91 |
| 2013/0110009 | A1 | 5/2013 | Salorio | |
| 2013/0218295 | A1 | 8/2013 | Holgate | |
| 2014/0028688 | A1* | 1/2014 | Houjou | G09G 5/006 345/520 |
| 2014/0067314 | A1* | 3/2014 | Ihashi | G01P 15/00 702/141 |

(Continued)

OTHER PUBLICATIONS

Barbro B. Johansson, "Brain Plasticity and Stroke Rehabilitation: The Willis Lecture", Stroke Journal of the American Heart Association, Jan. 2000; vol. 31: pp. 223-230.

(Continued)

*Primary Examiner* — Steve Rowland
(74) *Attorney, Agent, or Firm* — The Law Office of Patrick F. O'Reilly III, LLC

(57) ABSTRACT

A device configured to provide biofeedback on arm swing during walking, running, or other movement activities is disclosed herein. The device includes motion sensing means configured to sense the motion of an arm of a user during a movement activity and output one or more signals based upon the sensed arm motion; computational means configured to compute an arm swing angle of the arm of the user using the one or more signals outputted by the motion sensing means; and one or more signaling devices operatively coupled to the motion sensing means and computational means, the one or more signaling devices configured to emit one or more signals to the user that are based upon the computed arm swing angle of the user so as to provide biofeedback to the user regarding arm swing. The use of two devices, one on each arm of a user is also disclosed herein.

19 Claims, 6 Drawing Sheets

(56) References Cited

U.S. PATENT DOCUMENTS

| 2014/0188257 A1* | 7/2014 | Ura | A63B 71/06 |
| | | | 700/91 |
| 2014/0288681 A1* | 9/2014 | Watanabe | A61B 5/6828 |
| | | | 700/91 |
| 2014/0365169 A1* | 12/2014 | Pham | G01C 22/006 |
| | | | 702/160 |

OTHER PUBLICATIONS

Michael D. Lewek et al., "Arm swing magnitude and asymmetry during gait in the early stages of Parkinson's disease", Gait & Posture, Feb. 2010, vol. 31: pp. 256-260.

Sebastian O.H. Madgwick, "An efficient orientation filter for inertial and inertial/magnetic sensor arrays", Apr. 30, 2010, pp. 1-32, available at http://www.x-io.co.uk/res/doc/madgwick_internal_report.pdf.

* cited by examiner

FEEDBACK DEVICE TO IMPROVE ARM SWING

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a movement assessment apparatus. More particularly, the invention relates to a movement assessment apparatus configured to provide biofeedback to a user regarding one or more bodily movements executed by the user, and a method for providing biofeedback using the same.

2. Background and Description of Related Art

Parkinson's disease (PD) is one of a number of neuromuscular degenerative diseases which can lead to impaired movement or movement disorders. PD is caused by cell death and loss of dopaminergic neurons in the substantia nigra region of the brain. This results in a significant reduction of the production of dopamine, an essential neurotransmitter which controls motor function. The loss of dopamine production due to PD may result in a variety of symptoms including movement problems such as slowed or shortened gait and stride, stiffness, diminished or loss of arm swing on walking, tripping, falling, tremoring, bradykinesia, rigidity and other effects.

PD is often distinguished by similar disorders, for example essential tremor, due to the fact that PD initially manifests symptoms unilaterally, or on one side of the body first. This unilateral characteristic of movement symptoms leads to unequal movements between one side of the body and the other, creating further difficulties with mobility. As PD progresses, these movement problems increase, often to the point where mobility is significantly compromised and quality of life of the patient decreased. Although there are a number of effective pharmacological treatments which address decreasing dopamine levels and increasing mobility, often the differences in one side of the body compared to the other are not directly addressed.

There is a growing body of thought that argues for earlier intervention in the changes in mobility prior to significant loss of function. There is a need for devices which are designed to address earlier symptoms which eventually lead to more significant mobility issues. An early symptom of PD which eventually advances to mobility problems is limited and asymmetric arm swing.

Movement changes due to the effects of PD and loss of dopamine are often noticed by other people, such as family members, before the patient is aware of the movement deficiency. For movements such as gait, stride and arm swing which are learned in early childhood, one relies on muscle memory unless there is some indicator that there is a change in movement. In a healthy individual, there are biofeedback mechanisms which provide such indicators. In the PD patient, the loss of dopamine neurotransmitters likely compromises both the outward signal from the brain to the muscular-skeletal system as well as the return signal indicating the movement has been executed as expected. This breakdown leads to a lack of awareness in the PD patient of the loss of movement speed, amplitude and symmetry. There results in the patient a kinesthetic misperception which must be addressed for normal mobility to be maintained as long as possible.

Until recently it was thought that the generation of new neurons was confined to the earliest stages of life, or in the embryo. New studies are showing that all cortical areas of the brain, even in adults, can exhibit surprising neuroplasticity, or modulations in function and synaptic activity with time and repetitive stimulus. There is also evidence that neurogenesis is possible. Studies show increases in volume of specific cortical areas after various stimuli (see e.g., B. Johansson, Brain Plasticity and Stroke Rehabilitation: The Willis Lecture, Stroke Journal of the American Heart Association 2000; 31:223-230). Neuroplasticity has been credited for the recovery of lost function when the brain compensates for damaged or impaired regions through repetitive retraining of the body. These new neuro-pathways are created by repetitive stimulus. To achieve corrected repetitive motion stimulation requires some sensory bio-feedback system to allow the patient to feel by an alternative method, the corrected motion. This may allow the patient to bypass the damaged biofeedback creating the misperception of proper movement.

A good example of this approach is the use of speech therapy to overcome the PD symptom of soft and poorly inflected speech using audio recording and the physical feeling of the level of energy of speech correlated to volume. This compensates for the loss of personal auditory feedback, which does not indicate a problem to the patient. Further examples of alternative feedback and neuroplastic approaches are the use of singing to enhance speech and dancing to enhance motor abilities in PD patients, by accessing broader parts of the brain utilized by alternative but related activities.

Diminished or lack of arm swing in PD patients is often manifested unilaterally, with one arm swinging normally, or with an increased arc and greater range of motion than the other arm, which is often stiff and diminished in motion or still. This asymmetric motion of the arms while walking contributes to poor balance and a decline in normal gait and stride (see e.g., Lewek et al., Arm swing magnitude and asymmetry during gait in the early stages of Parkinson's disease, Gait & Posture 31 (2010) 256-260). The PD patient has the ability to consciously move the arm with specific intent, but there is no automatic rhythmic swing on walking. When intentionally moving the arm, the patient is using visual feedback to override the damaged natural impulse. This visual signal is limited to the forward swing of the arm as the back swing cannot be seen. Also, the amplitude of the arc of the swing may or may not match the other arm.

Therefore, what is needed is a device for providing feedback that can be used for training or retraining the body and brain to recognize and correct for abnormal or asymmetric arm swing in PD patients or others having a similar problem. Moreover, what is needed is a simple arm swing device that is capable of being effectively used to retrain individuals having diminished arm swing. Furthermore, an effective sensory feedback device is needed that can measure and indicate the range, speed and flow of the diminished arm as compared to the looser arm to obtain a normal pattern of gait, stride and balance. In addition, what is needed is a device that can measure, signal and feed back to the walker the speed, range, fluidity and any other indicators, in comparison to the other arm, or in comparison to a targeted normal arm swing.

BRIEF SUMMARY OF EMBODIMENTS OF THE INVENTION

Accordingly, the present invention is directed to a device configured to provide biofeedback on arm swing that substantially obviates one or more problems resulting from the limitations and deficiencies of the related art.

In accordance with one or more embodiments of the present invention, there is provided a device configured to provide biofeedback on arm swing during walking, running, or other movement activities. The device includes a motion sensing means configured to sense the motion of an arm of a user during a movement activity and output one or more signals based upon the sensed arm motion; a computational means configured to compute an arm swing angle of the arm of the user using the one or more signals outputted by the motion sensing means; and one or more signaling devices operatively coupled to the motion sensing means and the computational means, the one or more signaling devices configured to emit one or more signals to the user that are based upon the computed arm swing angle of the user so as to provide biofeedback to the user regarding arm swing.

In a further embodiment of the present invention, the computational means is further configured to determine at least one of: (i) a speed of the arm of the user, (ii) a length of a swing arc of the arm of the user, (iii) a forward swing of the arm of the user, (iv) a backward swing of the arm of the user, and (v) a fluidity of movement of the arm of the user.

In yet a further embodiment, the device further comprises means for comparing right and left arms of the user in order to determine a consistency of an arm swing between the right and left arms, and wherein the one or more signaling devices are further configured to emit one or more perceptible signals to the user when an inconsistency between the arm swing of the right and left arms exists.

In still a further embodiment, the motion sensing means comprises an inertial measurement unit that includes at least one of: (i) an accelerometer, (ii) a gyroscope, and (iii) a magnetometer.

In yet a further embodiment, the device is the form of either a handheld device or a wearable device.

In still a further embodiment, the device is the form of a wearable device, and wherein the device further comprises attachment means for attaching the wearable device to the arm of the user.

In yet a further embodiment, the attachment means comprises a strap or band formed using one or more extendable elastic materials.

In still a further embodiment, the device further comprises means for adjusting or tuning the device in order to accommodate a size or training needs of a particular user and/or different targeted arm motions of the user.

In yet a further embodiment, the one or more signals emitted by the one or more signaling devices are in the form of one or more of the following: (i) an audible signal, (ii) a vibratory signal or other type of tactile signal, and (iii) a visual signal.

In still a further embodiment, the device further comprises one or more program selection buttons configured to enable the user to selectively choose between a plurality of different precompiled programs loaded on the device.

In yet a further embodiment, at least one of the one or more signals emitted by the one or more signaling devices are configured to be detectable by a remote observer monitoring the arm swing of the user.

In still a further embodiment, the device further comprises data recording and storage means for recording and storing arm swing data acquired by the motion sensing means.

In accordance with one or more other embodiments of the present invention, there is provided a device configured to provide biofeedback on arm swing during walking, running, or other movement activities. The device includes a motion sensing means configured to sense the motion of an arm of a user during a movement activity and output one or more signals based upon the sensed arm motion; a computational means configured to compute an arm swing angle of the arm of the user using the one or more signals outputted by the motion sensing means; and one or more signaling devices operatively coupled to the motion sensing means and the computational means, the one or more signaling devices configured to emit one or more signals to the user and/or a remote observer that are based upon the computed arm swing angle of the user so as to provide biofeedback to the user regarding arm swing and/or arm swing assessment information to the remote observer.

In a further embodiment of the present invention, the motion sensing means comprises an inertial measurement unit that includes at least two of the following: (i) an accelerometer, (ii) a gyroscope, and (iii) a magnetometer.

In yet a further embodiment, the computational means is in the form of a central processing unit of a central control unit, the central control unit being operatively coupled to the motion sensing means and the one or more signaling devices.

In still a further embodiment, the one or more signaling devices comprise a first signaling device configured to emit a first type of signal and a second signaling device configured to emit a second type of signal, and wherein the device further comprises a selection switch or knob that is configured to enable the user to selectively choose between the first type of signal and the second type of signal or to activate both the first type of signal and the second type of signal.

In yet a further embodiment, the device further comprises means for comparing the motion of the arm of the user to a predetermined threshold level and/or to a predetermined arm swing path.

In accordance with yet one or more other embodiments of the present invention, there is provided a system configured to provide biofeedback on arm swing during walking, running, or other movement activities. The system includes: (i) a first device configured to be coupled to a first arm of a user, the first device comprising a first motion sensing means configured to sense the motion of the first arm of the user during a movement activity and output one or more first signals based upon the sensed first arm motion, the first device further comprising a first computational means configured to compute a first arm swing angle of the first arm of the user using the one or more first signals outputted by the first motion sensing means; and (ii) a second device configured to be coupled to a second arm of the user, the second device comprising a second motion sensing means configured to sense the motion of the second arm of the user during the movement activity and output one or more second signals based upon the sensed second arm motion, the second device further comprising a second computational means configured to compute a second arm swing angle of the second arm of the user using the one or more second signals outputted by the second motion sensing means; and (iii) at least one signaling device operatively coupled to at least one of the first and second motion sensing means and to at least one of the first and second computational means, the at least one signaling device configured to emit one or more signals to the user that are based upon the computed arm swing angle of at least one of the first and second arms of the user so as to provide biofeedback to the user regarding arm swing.

In a further embodiment of the present invention, the device further comprises means for comparing the motion of the first arm of the user to the motion of the second arm of the user.

In yet a further embodiment, the first device on the first arm of the user is configured to wirelessly communicate with the second device on the second arm of the user.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
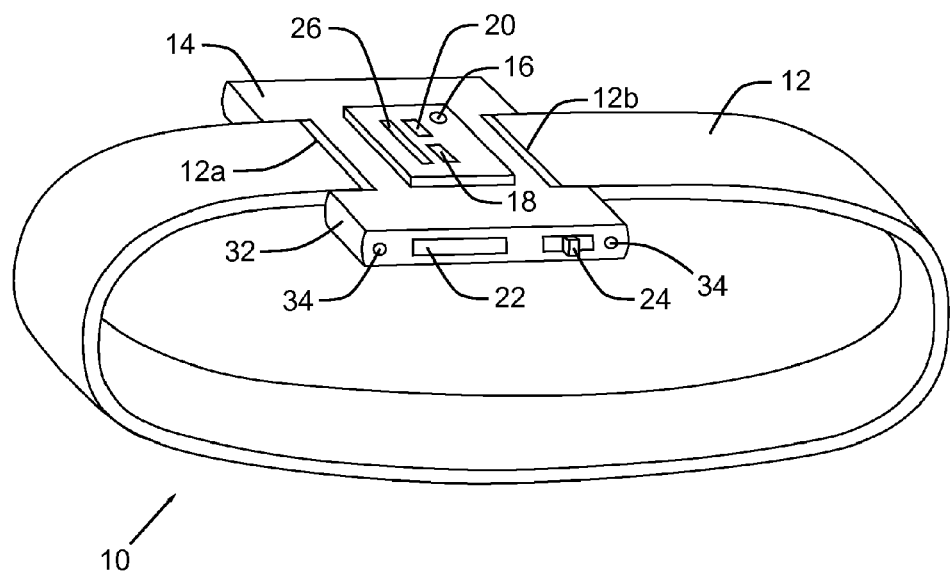
FIG. 1 is a diagrammatic frontal perspective view of an arm swing feedback device, according to one embodiment of the invention.

In one or more embodiments, a device is described herein that measures and/or signals to the patient, or others the critical characteristics of arm swing during walking, running or other mobile activities. The characteristics may include, but are not limited to, forward arc, back arc, distance of travel, speed and fluidity. The device may further have the capability to compare the movement characteristics of arm swing to the other arm, to a targeted physically therapeutic level or to an increasing level. The device may provide feedback on movement of the arms while walking, using a treadmill, jogging, running or using any mobility training devices. The feedback is of a nature that it cannot normally be obtained while walking. The device can be either mechanical or electrical, or some combination thereof. Feedback on the movement of the arms can be obtained by any sensory mechanism including but not limited to tactile, touch or pressure, audible signaling, lights, other visible signals, vibration, or any other means, and combinations thereof. The device may be assembled with existing electronic or other components, especially those currently used in hand-held electronic devices, pedometers, GPS systems, or others. The device may be designed using the tools of neuroplasticity and alternative sensory biofeedback mechanisms in order to produce a device that can compensate for a user's loss of motor capabilities.

Also, in one or more embodiments, the device can be tunable to allow gradual changes or adjustment for targeting therapeutic movement levels or to fit different sized users. Any aspect of arm movement that can be measured can be signaled back to the device user, including but not limited to total length of arc, length of forward swing or back swing, speed of swing, fluidity. The device may have the capability to compare the left and right arms for measuring consistency of swing. This may require one or more devices, depending on the design. The device may have remote signaling or wireless capability for immediate feedback to the user. It may also have the capability to store arm swing data for downloading and later comparison. It may also have the capability to signal a remote observer or clinician, if desired. The device should have the capability to signal while the user is walking normally, that is without the user needing to visually track arm swing, gait, or stride. A version of the device may be small, lightweight, portable, hand held or wrist attached, and unobtrusive. The device is not to be dependent on any specific clothing. The arm swing length, speed and/or angle monitoring device can be based on mechanical tension using a spring or elastomeric materials. It may be based on air flow, gravity, centripetal force, fluid or mechanical leveling, optical, radio frequency or sonar devices.

In addition, in one or more embodiments, the device may be made tunable for different targeted motions. It may have the capability to be weighted variably for strength improvement. The device can be used on a treadmill or during normal daily movement activities. For daily, non-treadmill use, the device may be discreet and not casually observable. The device is useful for PD patients with arm swing mobility losses and any other people who have loss of arm swing regardless of cause. The device is also particularly useful for early diagnosis and intervention, prior to a need for assistive walking devices. The device is simple in design with reasonably accessible costs to the user.

Now, with reference to FIGS. 1 and 2, an illustrative embodiment of a feedback device 10 configured to detect arm swing and provide tactile/auditory feedback will be described in detail. The illustrative embodiment of the feedback device 10 comprises a strap or band 12 which attaches to the wrist of the user. The strap or band 12 carries a control unit 14 of the feedback device 10. Referring initially to FIG. 1, it can be seen that the control unit 14 of the feedback device 10 may generally include: (i) a multi-color status light emitting diode (LED) 16 adapted to provide the user with visual feedback on the device's internal processes, such as battery life status, program run mode, etc.; (ii) a plurality of protocol selector buttons 18, 20 (e.g., a first protocol button 18 and a second protocol button 20), which serve as accessible user interfaces for the user to select one of the plurality of precompiled programs (e.g., two programs) stored in the memory cache of the unit 14; (iii) a universal serial bus ("USB") port 22 that functions as a power supply and data communication route when connected to a computer; (iv) a multi-position toggle switch or knob 24 (e.g., a two-position toggle switch 24) that enables the user to specify auditory feedback, in the form of a continuous tone, or tactile feedback, in the form of localized vibration around the wrist; and (v) a reconnect switch or button 26, which wirelessly reconnects one device 10 with a second device 10' located on the other wrist of the user.

Figure 2:
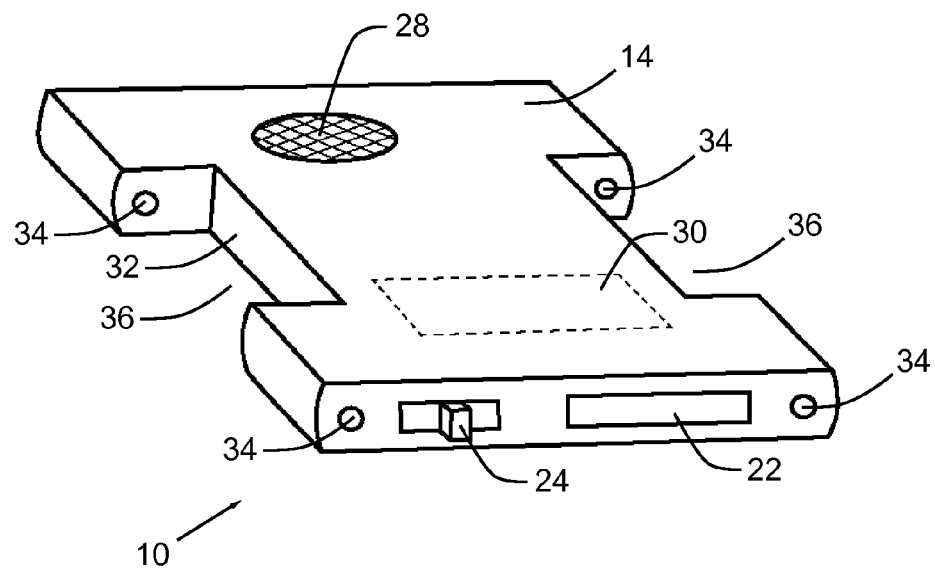
FIG. 2 is a diagrammatic rear perspective view of the arm swing feedback device of FIG. 1, wherein the strap of the device has been excluded.

Next, as shown in FIG. 2, the audio and tactile feedback components of the illustrative device 10 are embedded on the underside of the unit 14. FIG. 2 illustrates the orthographic view of the underside of the unit 14 illustrated in FIG. 1, with the strap or band 12 excluded for the purposes of clarity. As shown in this figure, the underside of the unit 14 may comprise an audio signaling device 28 (e.g., in the form of a buzzer speaker) and a tactile signaling device 30 (e.g., in the form of vibrating means). In the illustrative embodiment, the feedback may be provided to the user in the form of a continuous tone delivered by the audio signaling device 28, a vibration of the user's wrist by means of the tactile signaling device 30, or both a continuous tone delivered by the audio signaling device 28 and a vibration of the user's wrist by means of the tactile signaling device 30.

As described above, in the illustrated embodiment of FIGS. 1 and 2, the feedback device 10 is configured to be coupled to the limb of the user (e.g., to the wrist of the user) by the strap or band 12. In particular, as shown in FIG. 1, the two ends 12a, 12b of the strap or band 12 may be coupled to the outer housing 32 of the control unit 14 by means of respective pins or rods that pass through respective pin apertures 34 in the outer housing 32 of the unit 14. Also, as best shown in FIG. 2, the outer housing 32 of the unit 14 is provided with notches 36 disposed in the opposed sides thereof for accommodating the ends 12a, 12b of the strap or band 12. In one or more embodiments, the strap or band 12 may comprise an elastic band that is resilient so that it is capable of being stretched to accommodate the hand of the user, and then, fitted in place on the wrist of the user. In these embodiments, the band 12 can be formed from any suitable stretchable fabric, such as neoprene, spandex, and elastane. Alternatively, in one or more other embodiments, the band 12 could be formed from a generally non-stretchable fabric, and be provided with latching means or clasp means for allowing the band 12 to be split into two portions (e.g., the band 12 could be provided with a snap-type latching device on the rear portion of the band 12).

In other embodiments, the feedback device 10 may be in form of a handheld device that is simply held by the user in his or her hand. In these embodiments, the strap or band 12 is omitted entirely and the user merely holds the outer housing 32 of the unit 14 in his or hand.

Hereafter, an exemplary embodiment of the feedback device 10 will be described with reference to one or more block diagrams that diagrammatically illustrate the architecture of various components of the feedback device 10. With respect to these diagrammatic illustrations, it is to be understood that the connecting lines shown in the block diagram(s) included herein are intended to represent functional relationships and/or operational couplings between the various components.

Figure 5:
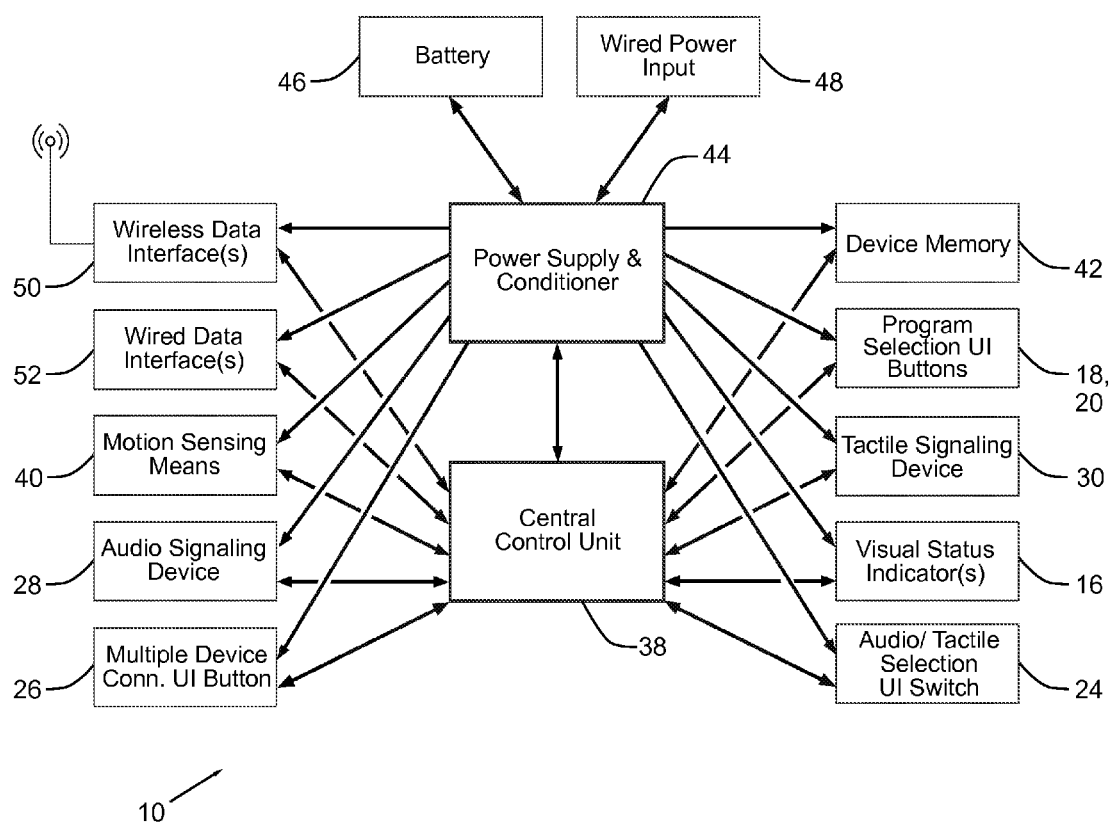
FIG. 5 is a schematic block diagram of constituent components of an illustrative feedback device, according to one embodiment of the invention.

Now, with reference to FIG. 5, an exemplary architecture of the various components that may form the illustrated feedback device 10 will be described in detail. As shown in FIG. 5, the feedback device 10 may generally comprise a central control unit or central processing circuit(s) 38 (disposed inside the housing 32), motion sensing means 40 that are operatively coupled to the central control unit 38, an audio signaling device 28 and a tactile signaling device 30 that are operatively coupled to the central control unit 38, device memory 42 operatively coupled to the central control unit 38 for storing data during the processing thereof, and a power supply and conditioner 44 operatively coupled to each of the electrical components 28, 30, 38, 40, 42. The power supply and conditioner 44 regulates the power that is delivered to the electrical components 28, 30, 38, 40, 42 by modifying the level and characteristics thereof (e.g., by regulating the voltage delivered from the power supply 46, 48 by adjusting the voltage level and characteristics in accordance with the specific needs of the electrical components 28, 30, 38, 40, 42). Referring again to FIG. 5, it can be seen that the primary power supply or power source for the feedback device 10 may be in the form of a battery 46 disposed within the housing 32 of the unit 14. The feedback device 10 may also comprise a wired power input 48 for charging the battery 46 inside the unit 14, or for providing supplementary power to the unit 14 when the battery has a low charge. For example, in some embodiments, the battery 46 may be in the form of a rechargeable battery and a battery charger may be connected to the wired power input 48 in order to charge the rechargeable battery when required. As shown in FIG. 5, no matter which one or combination of the power supplies 46, 48 is used in the feedback device 10, the power supplies 46, 48 are all operatively connected to the power supply and conditioner 44 so that the power delivered thereby can be conditioned prior to being transmitted to the electrical loads (e.g., electrical components 28, 30, 38, 40, 42) in the feedback device 10. The device memory 42 may comprise volatile memory, non-volatile memory, or a combination thereof. When non-volatile memory is included in the feedback device 10, it may be in the form of a relatively compact data storage device, such as a flash drive, memory cards (e.g., a Secure Digital (SD) card), memory sticks, or any combination thereof. As such, any of these devices may form the data recording and storage means of the feedback device 10.

In one or more embodiments, the central control unit 38 may comprise a microcontroller with 32 kilobytes (KB) of flash memory and a 16 MHz clock. In addition to logging and processing the arm swing data (e.g., computing arm swing angles, etc.), the microcontroller also controls the audio and tactile signaling devices 28, 30 (i.e., the cueing mechanisms of the feedback device 10).

Also, as shown in FIG. 5, the feedback device 10 may comprise one or more wireless data interfaces 50 for electrically coupling the feedback device 10 to other devices, such as a feedback device 10' located on the other wrist of a user or to a computer for analysis of the data. In one or more exemplary embodiments, the one or more wireless data interfaces 50 may comprise a Bluetooth device for operating as part of a personal area network ("PAN"), a Wi-Fi device for operating as part of a wireless local area network ("WLAN"), and/or a proprietary wireless interface device that utilizes a proprietary communications protocol. It is to be understood that the feedback device 10 may comprise one, two, or all three of these wireless data interface devices depending on the needs of the particular system in which they are being utilized.

Referring again to FIG. 5, the feedback device 10 also may comprise one or more wired data interfaces 52 for electrically coupling the feedback device 10 to other devices, such as a computer for analysis of the data, by hard wiring (e.g., an electrical wire or cable). In particular, the one or more wired data interfaces 52 may comprise the universal serial bus ("USB") port 22, which was described in conjunction with FIGS. 1 and 2 above, for accommodating a USB cable between devices (e.g., between the feedback device 10 and a remote computer being used for data analysis). Also, the one or more wired data interfaces 52 may comprise a proprietary data port for accommodating a proprietary cable between devices (e.g., between the feedback device 10 and a remote computer being used for data analysis). It is to be understood that the feedback device 10 may comprise one or both of these wired data interfaces 52 depending on the needs of the particular system in which they are being employed.

As described above in conjunction with FIG. 5, the feedback device 10 comprises motion sensing means 40 (i.e., one or more sensors 40) for sensing the motion of an arm of a user during a movement activity. In one or more exemplary embodiments, the motion sensing means or the one or more sensors 40 may comprise one or more accelerometers configured to measure at least one of: (i) a speed of the arm of the user, (ii) a length of a swing arc of the arm of the user, (iii) a forward swing of the arm of the user, (iv) a backward swing of the arm of the user, and (v) a fluidity of movement of the arm of the user. It is to be understood that, in some embodiments, the motion sensing means 40 (e.g., in the form of accelerometers) may be configured to measure all of the parameters (i) through (v).

Figure 6:
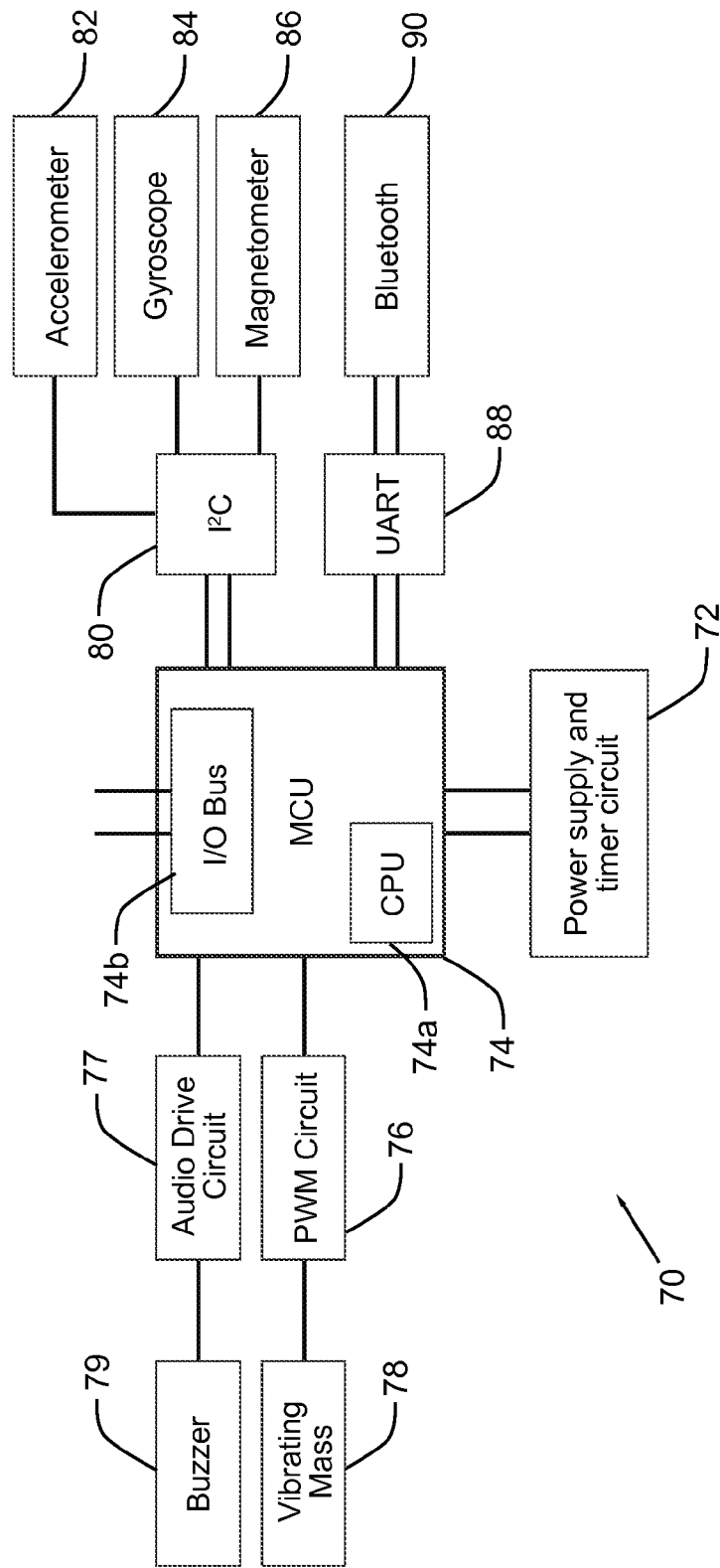
FIG. 6 is a schematic block diagram of certain electrical components of an illustrative feedback device, according to an exemplary embodiment of the invention.

In one or more embodiments, the motion sensing means 40 may comprise an inertial measurement unit that includes a plurality of different sensing devices operatively coupled to one another via an inter-integrated circuit (I$^2$C) 80. In one illustrative embodiment, with reference to electrical components diagram 70 of FIG. 6, the sensing devices of the inertial measurement unit may comprise a three-axis accelerometer 82, a three-axis gyroscope 84, and a three-axis magnetometer 86. In these one or more embodiments, each of these sensing devices is operatively coupled to the inter-integrated circuit 80. Also, as shown in FIG. 6, the electrical components of the feedback device 10, 10' further comprise a power supply and timer circuit 72, a micro-controller unit 74 (i.e., an MCU, which is an example of one type of central control unit 38 that may be used), a pulse width modulation (PWM) circuit 76, a vibrating mass 78, an audio drive circuit 77, a buzzer 79, a universal asynchronous receiver and transmitter (UART) 88 for Bluetooth communication 90. As shown in FIG. 6, the micro-controller unit 74 comprises a central processing unit (CPU) 74a and an input/output (I/O) bus 74b. The micro-controller unit 74 is the computational means in this illustrative embodiment. The micro-controller unit 74 is operatively coupled to the power supply and timer circuit 72. The micro-controller unit 74 is also operatively coupled to the vibrating mass 78 (i.e., a type of tactile signaling device 30) by means of the pulse width modulation circuit 76, to the buzzer 79 (i.e., a type of audio signaling device 28) by means of the audio drive circuit 77, and to inertial measurement unit (comprising the accelerometer 82, gyroscope 84, and magnetometer 86) by means of the inter-integrated circuit 80. It is to be understood that one or more components illustrated in FIG. 5 may be combined with the components of FIG. 6 as part of the overall device 10 (e.g., a device 10 comprising the components of FIG. 6 may also include components 16, 18, 20, 24, 26, 42, 46, 48, 50, 52 of FIG. 5).

Next, with reference once again to FIG. 5, the feedback device 10 also may comprise an audio signaling device 28 and a tactile signaling device 30 for providing sensory stimuli to a subject so as to enable the feedback device 10 to provide the subject with biofeedback regarding the movement of his or her arm or arms. In particular, the audio signaling device 28 may comprise a buzzer speaker, or the like, for delivering an audible cue to the subject, while the tactile signaling device 30 may comprise a vibratory signaling device for delivering vibrations to the arm of the user (e.g., to the wrist of the user). It is to be understood that, in some embodiments, the feedback device 10 may only include either audio signaling device 28 or the tactile signaling device 30, rather than both of the devices 28, 30.

Turning again to FIG. 5, the feedback device 10 also may comprise a plurality of user interface buttons or switches 18, 20, 24, 26 for allowing the user to interact with the feedback device 10 by controlling the settings thereof, etc. First of all, as explained above with regard to the discussion of FIG. 1, the feedback device 10 may at least include a first protocol button 18 for initiating a first precompiled program that is capable of being executed by the feedback device 10 and a second protocol button 20 for initiating a second precompiled program that is capable of being executed by the feedback device 10. Also, as mentioned above, the feedback device 10 may include a multi-position toggle switch or knob 24 (i.e., a two-position toggle switch 24) that enables the user to specify auditory feedback (e.g., in the form of a continuous tone delivered by the audio signaling device 28), or tactile feedback (e.g., in the form of localized vibration around the wrist delivered by the tactile signaling device 30). In another embodiment, the multi-position toggle switch or knob 24 may comprise a three-position toggle switch that enables the user to specify auditory feedback from the audio signaling device 28, tactile feedback from the tactile signaling device 30, or a combination of both auditory feedback from the audio signaling device 28 and tactile feedback from the tactile signaling device 30. In addition, as briefly mentioned above in conjunction with FIG. 1, the feedback device 10 may include a switch or button 26 (e.g., a reconnect switch) that wirelessly connects or reconnects a first device 10 (e.g., located on the right arm of the user) with a second device 10' (e.g., located on the left arm of the user).

Lastly, with reference again to FIG. 5, the feedback device 10 may include one or more visual status indicators (e.g., one or more LED status indicators 16) that provide the user with visual feedback on the device's internal processes, such as battery life status, program run mode, etc. The visual status indicators (e.g., one or more LED status indicators 16) may comprise a single color light emitting device that is either in an "on" state or an "off" state (e.g., low battery LED status indicator illuminates "red" when the power level of the battery 46 is low, but is otherwise unilluminated) or a multi-color light emitting device that changes colors depending on the operation of the feedback device 10 (e.g., when the feedback device 10 is operating in the first program mode, the multi-color LED status indicator is "green", but when the feedback device 10 is operating in the second program mode, the multi-color LED status indicator turns "red".

Next, an illustrative manner in which the central control unit 38 (which may include a microprocessor or central processing unit) of the feedback device 10, 10' performs the arm swing angle calculations will be explained in detail. In particular, this calculation procedure will describe the manner in which the arm swing angles are determined using the output signals from the motion sensing means 40 (i.e., the inertial measurement unit with the three-axis accelerometer, three-axis gyroscope, and a three-axis magnetometer). In one or more embodiments, the computational means that carries out the arm swing angle calculations comprises a specially-programmed control unit or central control unit 38 (or micro-controller unit 74).

It is to be understood that the aforedescribed functionality and calculation processes of the feedback devices 10, 10' can be carried out by the central control unit 38 (or micro-controller unit 74) utilizing software, hardware, or a combination of both hardware and software. For example, the central control unit 38 (or micro-controller unit 74) can be specially programmed to carry out the functionality described hereinafter. In one embodiment of the invention, the computer program instructions necessary to carry out this functionality may be loaded directly onto a data storage device (e.g., SD card) of the feedback device 10, 10' and subsequently executed by the microprocessor of the central control unit 38 of the feedback device 10, 10'. Also, in the disclosure, when a reference is made to a central control unit or data processing device that is "configured to", "arranged to" and/or "configured and arranged to" perform a specific function (e.g., a central control unit or data processing device configured and arranged to perform a specific function), it is to be understood that, in one or more embodiments of the invention, this means that the central control unit or data processing device is specially programmed to carry out the particular function (e.g., the central control unit or data processing device being specially programmed to perform a specific function).

As explained above, in an illustrative embodiment, the motion sensing means 40 of the feedback device 10, 10' comprises a three-axis accelerometer, a three-axis gyroscope, and a three-axis magnetometer. Each of these sensing devices or sensors has the ability to measure readings about all three coordinate axes. Based on the available sensor readings, the feedback device 10, 10' calculates the roll, pitch and yaw angles by combining sensor measurements using a complimentary filter. For example, the roll angle is calculated by combining sensor readings from the accelerometer and gyroscope of the motion sensing means 40. Firstly, a filter with the following form is developed:

$$G(s) = \frac{sK_p + K_I}{s^2 + sK_p + K_I} \tag{1}$$

where G(s) is a low pass filter, $K_I$ and $K_p$ are integral and proportional controller constants from a proportional integral (PI) controller, and s is the Laplace transform term. A complimentary filter is then calculated using the relationship, 1-G(s), which is equivalent to a high pass filter. Finally, the angle of interest is calculated using the following relationship:

$$\phi_m = [(1 - G(s)]\frac{\dot{\phi}_g}{s} + G(s)\theta_a \tag{2}$$

where $\dot{\emptyset}_g$ is the angular rate measured along one axis from the gyroscope calculated from the matrix below:

$$\begin{vmatrix} \dot{\phi}_g \\ \dot{\theta}_g \\ \dot{\varphi}_g \end{vmatrix} = \begin{vmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{vmatrix} \begin{vmatrix} p \\ q \\ r \end{vmatrix} \tag{3}$$

p, q, and r are the raw gyroscope sensor values and $\emptyset_a$ is the calculated Euler angle (in this example, the roll angle) approximated from the equation below:

$$\phi_a = \mathrm{asin}\left(\frac{-a_y}{g*\cos(\theta)}\right) \tag{4}$$

where $a_y$ is the accelerometer reading along the y axis, g is the earth's acceleration due to gravity (9.81 m/s$^2$) and the pitch angle θ can be determined from the following equation:

$$\theta = \left(\mathrm{asin}\left(\frac{a_x}{g}\right)\right) \tag{5}$$

where $a_x$ is the accelerometer reading along the x axis. The pitch angles are calculated from the same equation (2) with the exception that $\emptyset_a$=θ. Finally, the yaw angle is calculated by combining the gyroscope and magnetometer sensor readings in generally the same form as equations (1-3), so the equation becomes:

$$\varphi_m = [(1 - G(s)]\frac{\dot{\varphi}_g}{s} + G(s)\varphi_{mag} \tag{6}$$

$$\begin{vmatrix} H_{magx} \\ H_{magy} \\ H_{magz} \end{vmatrix} = \begin{vmatrix} \|n\| & 0 & 0 \\ 0 & \|n\| & 0 \\ 0 & 0 & \|n\| \end{vmatrix} \begin{vmatrix} H_1 \\ H_2 \\ H_3 \end{vmatrix} \tag{7}$$

where $\|n\|$ is the magnetic norm calculated from the raw magnetometer sensor readings, $H_1$, $H_2$, and $H_3$ and $H_{magx}$, $H_{magy}$, and $H_{magz}$ are the magnetic vector values along the x, y and z axes. Finally, the yaw angle is calculated as follows:

$$\varphi_{mag} = \mathrm{atan2}(-H_{magy}, H_{magx}) * \frac{180}{\pi} \tag{8}$$

With the above calculations, all three Euler angles (i.e., roll, pitch and yaw) are obtained for the feedback devices 10, 10', which are attached to the wrists of the user.

Alternatively, the feedback devices 10, 10' have the ability to resolve the roll—ϕ (rotation about the X-axis), pitch—θ (rotation about the Y-axis) and yaw—Φ (rotation about the Z-axis) from the gyroscope, accelerometer and magnetometer embedded in the inertial measurement unit (IMU) through quaternion angle conversions to Euler angles. A quaternion is a four dimensional complex number that represents the orientation of a rigid body or coordinate frame in three dimensional space. In order to generate a quaternion for each feedback device 10, 10', an efficient orientation filter (e.g., as described in "An efficient orientation filter for inertial and inertial/magnetic sensor arrays" by Sebastian O. H. Madgwick) may be employed to resolve the calculations. In this method, orientation information from angle rates in the form of a quaternion is calculated from the gyroscope. With the measured angular rate signals in the coordinate frame of the sensor, the following equation is initially utilized:

$$^S\omega_t = [0\ \omega_x, \omega_y, \omega_z] \tag{9}$$

Where $\omega_x$ is the angular rate along the x axis, $\omega_y$ is the angular rate along the y axis, and $\omega_z$ is the angular rate along the z axis in the sensor, S, coordinate frame. Then, the quaternion derivate representing the angular rate of change of orientation of the earth's coordinate frame as observed from the devices' coordinate frame is calculated as the quaternion product of the $^S\omega_t$ and the quaternion representation of the coordinate frame of the earth as observed within the sensors coordinate frame, $^S_E q$, as follows:

$$^S_E \dot{q}_{\omega,t} = \frac{1}{2}\,^S_E q_{est,t-1} * S_{\omega_t} \tag{10}$$

Finally, the quaternion representing the orientation from the gyroscope is computed by integrating equation (10) over an interval of time $\Delta t$ so as to obtain the following equation:

$$^S_E q_{\omega,t} = \,^S_E q_{est,t-1} + \,^S_E \dot{q}_{\omega,t} \Delta t \tag{11}$$

This quaternion from the gyroscope is then normalized and combined with an optimal solution that fuses the accelerometer and magnetometer sensor information to produce a quaternion estimate that minimizes the discrepancy between the earth's gravity and magnetic fields in the sensors coordinate frame to the reference gravitational and magnetic fields in the earth's coordinate frame. The optimization problem reduces to the following objective function:

$$f(^S_E q, ^E d, ^S s) = \,^S_E q^* * ^E d * \,^S_E q - \,^S s \tag{12}$$

Where $^E d$ is the reference direction of a field [0 dx dy dz], $^S_E q^*$ is the complex conjugate of the quaternion $^S_E q$ and finally $^S s$, is the sensor measurement values [0 sx sy sz].

A gradient decent algorithm is used to find solution of the quaternion estimate for n iterations resulting in n orientation estimation for the minimizing function and it takes the following form:

$$^S_E q_{k+1} = \,^S_E q_k - \mu \left( \frac{\nabla f(^S_E q, ^E d, ^S s)}{\|\nabla f(^S_E q, ^E d, ^S s)\|} \right), k = 0, 1, 2, \ldots, n \tag{13}$$

$$\nabla f(^S_E q, ^E d, ^S s) = J^T(^S_E q, ^E d) f(^S_E q, ^E d, ^S s) \tag{14}$$

where $J^T$ is the Jacobian of the function. The minimizing function can be fully expanded into matrix form as follows:

$$f(^S_E q, ^E d, ^S s) = \tag{15}$$

$$\begin{bmatrix} 2d_x\left(\frac{1}{2} - q_3^2 - q_4^2\right) + 2d_y(q_1 q_4 + q_2 q_3) + 2d_z(q_2 q_4 + q_1 q_3) - s_x \\ 2d_x(q_2 q_3 - q_1 q_4) + 2d_y\left(\frac{1}{2} - q_2^2 - q_4^2\right) + 2d_z(q_1 q_2 + q_3 q_4) - s_y \\ 2d_x(q_1 q_3 + q_2 q_4) + 2d_y(q_3 q_4 + q_1 q_2) + 2d_z\left(\frac{1}{2} - q_2^2 - q_3^2\right) - s_z \end{bmatrix}$$

And the Jacobian function is defined as:

$$J^T(^S_E q, ^E d) = \tag{16}$$

$$\begin{bmatrix} 2d_q q_4 - 2d_z q_3 & 2d_y q_3 + 2d_z q_4 & -4d_x q_3 + 2d_y q_2 - 2d_z q_1 & -4d_x q_4 + 2d_y q_1 + 2d_z q_2 \\ 2d_z q_2 - 2d_x q_4 & 2d_x q_3 - 4d_y q_2 + 2d_z q_1 & 2d_x q_2 + 2d_z q_4 & -2d_x q_1 - 4d_y q_4 + 2d_z q_3 \\ 2d_x q_3 - 2d_y q_2 & 2d_x q_4 - 4d_z q_2 - 2d_y q_1 & 2d_x q_1 + 2d_y q_4 - 4d_z q_3 & 2d_x q_2 + 2d_y q_3 \end{bmatrix}$$

The reference gravitational field, $^E g = [0\ 0\ 0\ 1]$, where 1 corresponds to the earth's acceleration due to gravity (9.81 m/s$^2$ or 1 G) and the reference magnetic field, $^E b = [0\ b_x\ 0\ b_z]$, where $b_x$, is the magnetic field component along the x axis and $b_z$, is the magnetic field component along the z axis. The sensor measurement of the earth's gravitational field in the frame of the accelerometer is $^S a = [0\ ax\ ay\ az]$ and the sensor measurement of the earth's magnetic field in the frame of the magnetometer is $^S m = [0\ mx\ my\ mz]$. Therefore the minimizing function and the Jacobian of the accelerometer becomes:

$$f(^S_E q, ^E g, ^S a) = \begin{bmatrix} 2(q_2 q_4 + q_1 q_3) - a_x \\ 2(q_1 q_2 + q_3 q_4) - a_y \\ 2\left(\frac{1}{2} - q_2^2 - q_3^2\right) - a_z \end{bmatrix} \tag{17}$$

$$J^T(^S_E q, ^E g) = \begin{bmatrix} -2q_3 & 2q_4 & -2q_1 & 2q_2 \\ 2q_2 & 2q_1 & 2q_4 & 2q_3 \\ 0 & -4q_2 & -4q_3 & 0 \end{bmatrix} \tag{18}$$

Likewise, the minimizing function and the Jacobian of the magnetometer becomes:

$$f(^S_E q, ^E b, ^S m) = \begin{bmatrix} 2b_x\left(\frac{1}{2} - q_3^2 - q_4^2\right) + 2b_z(q_2 q_4 + q_1 q_3) - m_x \\ 2b_x(q_2 q_3 + q_1 q_4) + 2b_z(q_1 q_2 + q_3 q_4) - m_y \\ 2b_x(q_1 q_3 + q_2 q_4) + 2b_z\left(\frac{1}{2} - q_2^2 - q_3^2\right) - m_z \end{bmatrix} \tag{19}$$

$$J^T({}_E^S q, {}^E d) = \begin{bmatrix} -2b_z q_3 & 2b_z q_4 & -4b_x q_3 - 2b_z q_1 & -4b_x q_4 + 2b_z q_2 \\ 2b_z q_2 - 2b_x q_4 & 2b_x q_3 + 2b_z q_1 & 2b_x q_2 + 2b_z q_4 & -2b_x q_1 + 2b_z q_3 \\ 2b_x q_3 & 2b_x q_4 - 4b_z q_2 & 2b_x q_1 - 4b_z q_3 & 2b_x q_2 \end{bmatrix} \quad (20)$$

The combination of the two minimization functions will allow for the development of a more accurate measurement of the earth's magnetic and gravitational field. As such, a new solution which optimizes the alignment of the sensor readings from the accelerometer and magnetometer and the reference fields is generated:

$$f_{g,b}({}_E^S q, {}^E g, {}^S a, {}^E b, {}^S m) = \begin{bmatrix} f_g({}_E^S q, {}^E g, {}^S a) \\ f_b({}_E^S q, {}^E b, {}^S m) \end{bmatrix} \quad (21)$$

$$J_{g,b}({}_E^S q, {}^E g, {}^E b) = \begin{bmatrix} J_g^T({}_E^S q, {}^E g) \\ J_b^T({}_E^S q, {}^E b) \end{bmatrix} \quad (22)$$

From the above objective function (21) and the Jacobian (22), a new estimate of the quaternion of the sensor readings, ${}_E^S q_{\nabla,t}$ can now be calculated as follows:

$${}_E^S q_{\nabla,t} = {}_E^S q_{est,t-1} - \mu_t \left( \frac{\nabla f}{\|\nabla f\|} \right) \quad (23)$$

$$\nabla f = \begin{cases} J_g^T({}_E^S q_{est,t-1}, {}^E g) f({}_E^S q_{est,t-1}, {}^E g, {}^S a) \\ J_{g,b}^T({}_E^S q_{est,t-1}, {}^E b) f_{g,b}({}_E^S q_{est,t-1}, {}^E g, {}^S a, {}^E b, {}^S m) \end{cases} \quad (24)$$

Finally, an estimation of the orientation of the earth frame as seen in the coordinate frame for the feedback device 10, 10' is estimated by a weighted combination of ${}_E^S q_{\omega,t}$ from equation (11) and ${}_E^S q_{\nabla,t}$ from equation (23) as follows:

$${}_E^S q_{est,t} = {}_E^S q_{est,t-1} + {}_E^S \dot{q}_{est,t} \Delta t \quad (25)$$

$${}_E^S \dot{q}_{est,t} = {}_E^S \dot{q}_{\omega,t} - \beta {}_E^S \dot{q}_{\epsilon,t} \quad (26)$$

where β in equation (26) is the magnitude of gyroscope measurement error.

$${}_E^S \dot{q}_{\epsilon,t} = \frac{\nabla f}{\|\nabla f\|} \quad (27)$$

A conversation can now be applied to the final quaternion estimate ${}_E^S q_{est,t}$, which will be a four dimensional complex number with four entries, from which a rotation matrix is obtained that allows for calculation of the roll—φ (rotation about the X-axis), pitch—θ (rotation about the Y-axis) and yaw—Φ (rotation about the Z-axis). The rotation matrix will have the form:

$${}_E^S q_{est,t} = \begin{bmatrix} 2q_1^2 - 1 + 2q_2^2 & 2(q_2 q_3 + q_1 q_4) & 2(q_2 q_4 - q_1 q_3) \\ 2(q_2 q_3 - q_1 q_4) & 2q_1^2 - 1 + 2q_3^2 & 2(q_3 q_4 - q_1 q_2) \\ 2(q_2 q_4 - q_1 q_3) & 2(q_3 q_4 - q_1 q_2) & 2q_1^2 - 1 + 2q_4^2 \end{bmatrix} \quad (28)$$

From the above rotation matrix, the angles of interest can now be calculated as follows:

$$\phi = A\tan 2(2(q_2 q_3 - q_1 q_4), 2q_1^2 - 1 + 2q_2^2) \quad (29)$$

$$\theta = -\sin^{-1}(2(q_2 q_4 + q_1 q_3)) \quad (30)$$

$$\Phi = A\tan 2(2(q_3 q_4 + 2q_1 q_2), 2q_1^2 - 1 + 2q_4^2) \quad (31)$$

In addition, as explained above, feedback device 10, 10' may be configured to determine (i) a speed of the arm of the user, (ii) a length of a swing arc of the arm of the user, (iii) a forward swing of the arm of the user, (iv) a backward swing of the arm of the user, and (v) a fluidity of movement of the arm of the user. Like the arm swing angles described above, the requisite calculations may be carried out by the central control unit 38 (or micro-controller unit 74) after the raw data has been measured by the inertial measurement unit of the feedback device 10, 10'. In particular, the accelerometer 82 of the inertial measurement unit is subjected to both rotational acceleration and linear accelerations along the arc of the swing at the wrist of a user. Therefore, the reading(s) of the accelerometer 82 may be represented in the form of the following equation:

$$a_m = R(a_l - g) \quad (32)$$

By rearranging equation (32), the following equation may be obtained for the linear acceleration:

$$a_l = R^{-1} a_m + g \quad (33)$$

where $a_m$ is a 3×1 accelerometer measurements vector, R is a 3×3 rotation matrix, $a_l$ is a 3×1 linear acceleration and g is a gravity vector, [0 0 1].

Using the calculated roll, pitch and yaw from the complimentary filter, outlined in detail above, the rotation matrix, R, may be estimated and the linear acceleration of the feedback device 10, 10' may be calculated. The position and velocity of the feedback device 10, 10' is then approximated using a Kalman filter. The following equations of motion are used to describe the kinematic systems for the feedback device 10, 10' on each wrist of a user along a single dimensional axis:

$$\text{position}\{k+1\} = \text{position}\{k\} + T * \text{velocity}\{k\} + \frac{T^2}{2} * \text{acceleration}\{k\} \quad (34)$$

$$\text{velocity}\{k+1\} = \text{velocity}\{k\} + T * \text{acceleration}\{k\} \quad (35)$$

$$\text{acceleration}\{k+1\} = \text{acceleration}\{k\} \quad (36)$$

In above equations (34), (35), and (36), T is the time step interval. For the above system, the state vector estimated by the Kalman filter process is:

$$X_k = \begin{vmatrix} \text{position} \\ \text{velocity} \\ \text{acceleration} \end{vmatrix} \quad (37)$$

And the following linear model may be used for representing the process:

$$X_{k+1} = AX_k + w_k \quad (38)$$

$$Y_k = HX_k + z_k \quad (39)$$

Where $X_k$ is a state variable, $Y_k$ is the measurement, A is the state transition matrix, H is the state-to-measurement matrix, $w_k$ is state transition noise and $z_k$ is the measurement noise. Both the transition and measurement noise, are assumed to be white Gaussian noise (zero mean) signals and are independent. The state transition matrix A is represented as follows:

$$A = \begin{vmatrix} 1 & T & \frac{T^2}{2} \\ 0 & 1 & T \\ 0 & 0 & 1 \end{vmatrix} \quad (40)$$

While state-to-measurement matrix H is represented as follows:

$$H = \begin{vmatrix} 0 & 0 & 0 \\ 0 & 0 & 0 \\ 0 & 0 & 1 \end{vmatrix} \quad (41)$$

Finally, the covariance matrix Q for the process is given as follows:

$$Q = q \begin{pmatrix} \frac{T^5}{20} & \frac{T^4}{8} & \frac{T^3}{6} \\ \frac{T^4}{8} & \frac{T^3}{3} & \frac{T^2}{2} \\ \frac{T^3}{6} & \frac{T^2}{2} & T \end{pmatrix} \quad (42)$$

Where, in above equation (19), $q = \sigma^2$ (the variance of accelerometer reading along a particular axis).

Following the steps outlined by the Kalman filter algorithm, which is a standard optimal state estimation process, the feedback device 10, 10' attains an estimate of its position and velocity in space. This same process is repeated for the remaining two dimensions to obtain the full three-dimensional (3D) kinematics of the devices 10, 10'.

The speed of the arm of the user is simply read as the estimated three-dimensional (3D) velocity of the feedback device 10, 10' from the Kalman filter. With regard to the arm swing arc length, the feedback device 10, 10' tracks for instances where the linear acceleration of the arm is zero and where the sign of the device displacement switches from positive to negative to mark peak front and back arm swing locations. This process is simultaneously checked with the angular rate sensors from the gyroscope, to enhance the detection of an inflection point along the arc of arm swing. The linear distance between the peaks is selected as the length of arm swing. Based on an initial calibration sequence that the user performs before the entire feedback device 10, 10' initiates the cueing system, the feedback device 10, 10' is able to determine a standard reference body position. This body position will be based on users' hands comfortably on their sides or as specified by a physician. From this reference position, forward and backward movements can be determined by the feedback device 10, 10'. The rms or root mean square of the linear acceleration and rotational rates from the gyroscope 84 are calculated as measures of fluidity of movement of arm swing.

Figure 7:
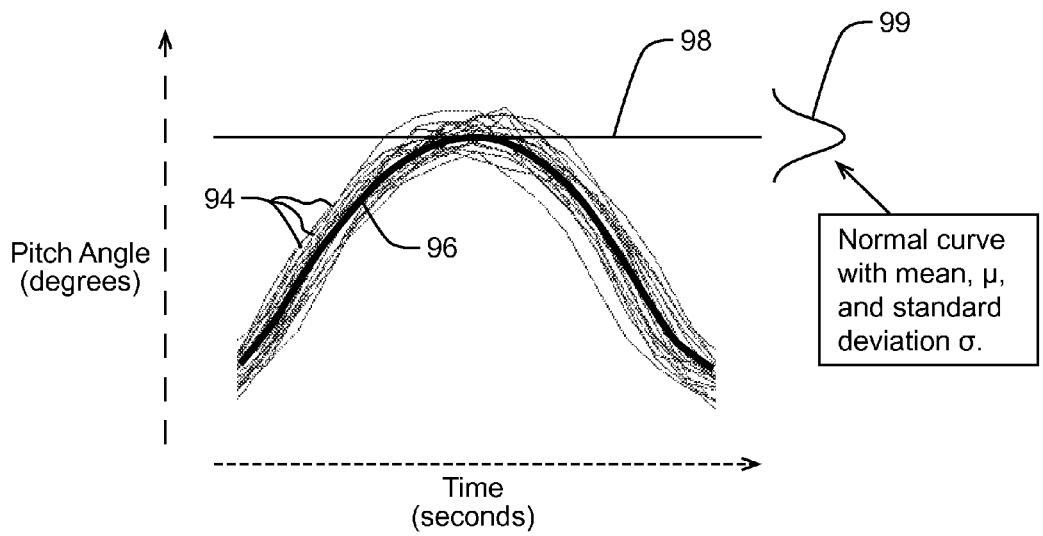
FIG. 7 is an exemplary graph that represents the functionality of an illustrative feedback device normalization procedure.

Now, the self-calibration and normalization procedures that are done at the startup of the feedback devices 10, 10' will be explained. With the two feedback devices 10, 10' secured to the wrists of a user, the self-calibration procedure is initiated either through holding the reconnect button 26 for an extended period (approximately 5 seconds) or moving their arms in a preconfigured gesture pattern. The device 10, 10' may be confirmed to be in the self-calibration state through the visual status indicator 16 (e.g., a status LED), which blinks rapidly to indicate the self-calibration state. An alert cue for initiation of the calibration route is then provided to the user through three consecutive beeps, at which point the users will be prompted to move their arms to their sides in a relaxed position. The user maintains his or her arms in a relaxed position for at least 10 seconds then, three consecutive beeps alerts the user of the end of the self-calibration. During this period, the devices 10, 10' compile data for the roll, pitch, and yaw angles in order to calculate an average orientation of the surface of the printed circuit board on which all the sensors are affixed. This roll, pitch, and yaw angle combination serves the purpose of defining a reference for static arms at the user's sides. At the conclusion of the self-calibration step, the feedback device 10, 10' alerts the user that it is about to enter the user standardization or normalization process by having the visual status indicator 16 (e.g., a status LED) blink rate drop by half. The user then repeats the earlier process of holding the reconnect button 26 for an extended period or performing the preconfigured gesture to confirm their readiness for the next procedure. Once again three beeps prompt the user to place his or her arms at his or her sides, after 5 seconds the two devices 10, 10' simultaneously coordinate the initiation of a metronome (operating at 60 beats per minute) which prompts the user to swing his or her arms as if they were walking, but remaining stationary, to a comfortable height and angle forwards and backwards for 20 seconds. Over this period, using the previously calculated static reference, cycles of arm swing trajectories for roll, pitch, yaw angles and linear displacements in the x, y, and z directions are overlapped and the results data is logged into respective vectors. For each vector, a normal curve, similar to that in FIG. 7, is fitted to the data for a particular event along the cycle, for example maximum forward pitch angle (peak), thereby producing statistics such as the mean ($\mu$) and standard deviation ($\sigma$) of the distribution for a variable of interest. For example, an exemplary representation of the functionality of the device normalization procedure is illustrated in FIG. 7. As shown in this figure, multiple cycles 94 of pitch angle from arm swing angle from one feedback device 10, 10' are depicted. In FIG. 7, the x axis represents time in seconds and the y axis represents the magnitude of the pitch angle in degrees. The smaller curve 99 on the right side of FIG. 7 depicts the normally fitted curve for the maximum forward pitch arm angle center at the peak of the pitch angle normal curve 96, which represents the average of all the cycles 94 of the pitch angle. This normal curve 96 is produced for the individual feedback devices 10, 10' on both wrists of the user. The horizontal line 98 is the tangent line to the normal curve 96.

After the final cue for the metronome, both feedback devices 10, 10' may terminate the metronome beeps and stay silent for 5 seconds, then 3 final consecutive beeps signify the end of the normalization or user standardization process and the visual status indicator 16 (e.g., a status LED), turns a continuous solid color. The gesture activation pattern described above is only activated on initial startup of the device 10, 10', and then subsequently disengaged, unless the user configures the device not to do so.

Also, as briefly mentioned above, the feedback devices 10, 10' may be tunable to allow gradual changes or adjustment for targeting therapeutic movement levels or to fit different sized users. That is, the feedback devices 10, 10' may comprise means for adjusting or tuning the device 10, 10' in order to accommodate a size or training needs of a particular user and/or different targeted arm motions of the user. This means for adjusting or tuning the devices 10, 10' may comprise a specially-programmed control unit or central control unit 38 (i.e., the devices 10, 10' each comprise a software program for carrying out this functionality that is executed by the microprocessor or central processing unit of the central control unit 38). In particular, the motion cues (e.g., as generated by audio signaling device 28 and/or tactile signaling device 30) may be tailored to each individual based on recommendations from a physician or through preprogrammed training routines, which automatically designate arm swing target points. These preprogrammed trajectory goals incorporate a real-time feedback system, to ensure that the targets are actually being achieved. The individual simply performs two normalization procedures. The first normalization procedure requires the user to swing his or her arms at a natural self-paced speed, thus creating a unique distribution of arm swing limits. The second normalization procedure is a static measurement, where the subject simply holds his or her hands to the sides. These procedures only need to be performed once, provided that the same individual uses the same devices 10, 10'.

In one illustrative embodiment, the cueing system may simply amount to specifying an arm swing displacement angle that is a certain standard deviation away from the mean normal arm swing displacement position. Therefore a physician, for example, may develop a specific training program specifying a target point that is $1.5\sigma_{left\ device}$ and $2.0\sigma_{right\ device}$ if the right arm displacement is smaller than that of the left arm displacement. Alternatively, pre-programmed training routines, may control the standard deviation levels by increasing them in a linear or a random fashion.

For example, a linear pre-programmed routine, may select an initial target point that is within the normal range of arm swing pitch angle for the user, and then only after a number of cycles, increase the target point by a fixed step interval. The process then repeats itself continually, until it reaches its hard limit set in the program at which point it resets itself to zero. As one specific example, a normal maximum arm swing pitch angle of the following data points is collected by the left feedback device 10':

Left Feedback Device=[12°, 7°, 12°, 7°, 9°, 11°, 13°, 6°, 14°, 13°];

The linear pre-programmed routine, may select an initial reference target of 10.4°, which is mean of the above collected data. After a number of cycles of successful arm swing cueing at this level, if a step size=1° is configured for the system, then the target will increase to 11.4°. On the other hand, if the random pre-programmed routine is selected, the target may increase to a random number.

Figure 3:
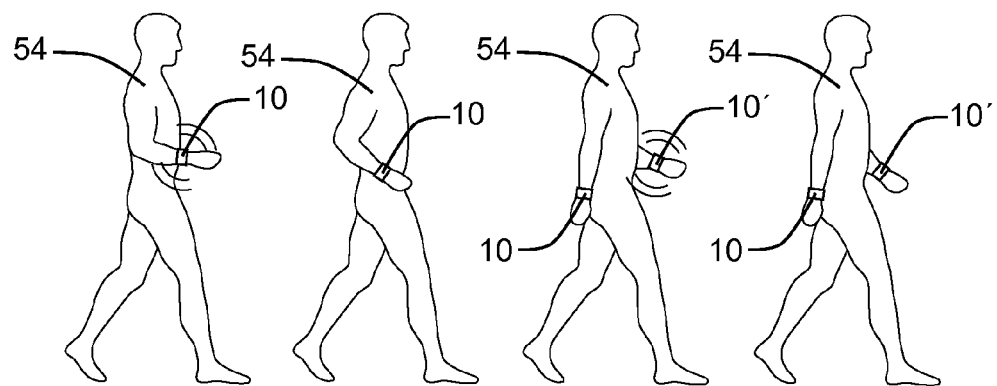
FIG. 3 illustrates a system comprising the arm swing feedback devices disposed on the respective arms of a user, wherein tactile cues are being forwarded to the user based on the performance of the user's arms in a selected program protocol.

Now, with reference to FIGS. 1-3, an exemplary manner in which the feedback devices 10, 10' are used will be explained. Initially, when feedback devices 10, 10' are provided on each of the wrists of a user 54 (see FIG. 3), the user 54 initially establishes wireless communication between the primary device 10 located on the right wrist of the user 54 and the secondary device 10' located on the left wrist of the user 54 by enabling the reconnect switch or button 26 (e.g., by depressing the button 26). This action simultaneously engages the motion sensing means 40 (e.g., embedded accelerometers) in both devices 10, 10', thereby making it possible to measure orientation angles with respect to gravity in three-dimensional (3D) space for both arms. Next, the user 54 has to set the option for the type of feedback to receive by adjusting the audio/tactile selection knob or switch 24 to one of the two positions, namely a first position to activate the audio signaling device 28 for receiving a tone-based cue, or a second position to activate the tactile signaling device 30 for receiving a vibration cue. Once a stable connection has been established between the pair of devices 10, 10', the user 54 selects a program protocol (e.g., by depressing one of the protocol selector buttons 18, 20) that relates the delivery of sensory feedback with the arm deflection. The user 54 can then begin to move with arm deflection cues being relayed back to improve arm swing during walking, running, or another movement activity. FIG. 3 illustrates a system comprising two feedback devices 10, 10' in use, with tactile cues being forwarded to the user 54 based on their measured performance in the current program protocol.

Figure 4:
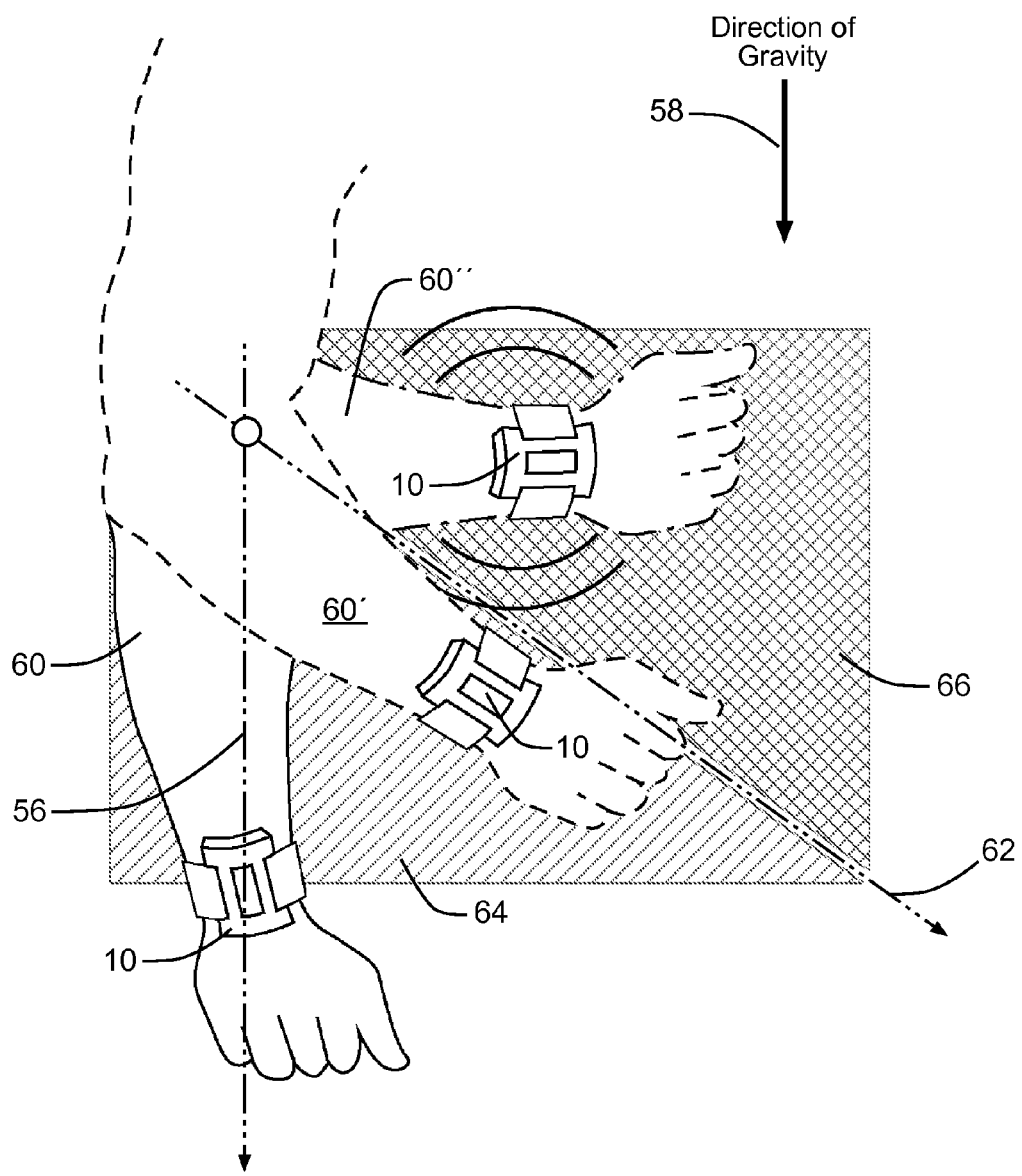
FIG. 4 diagrammatically illustrates a behavior of a single arm swing feedback device during a threshold program protocol.

Next, an exemplary threshold program protocol executed by the feedback devices 10, 10' will be described with reference to FIG. 4. The exemplary threshold protocol can be loaded onto the feedback device central control unit 38 (or MCU 74) from a computer, and then selected by the user 54 by engaging the corresponding button (e.g., program selection button 18 or 20) assigned with the program. That is, in one or more embodiments, the means for comparing the motion of the arm of the user to a predetermined threshold level and/or to a predetermined arm swing path comprises a specially-programmed control unit or central control unit 38. FIG. 4 diagrammatically illustrates the designed behavior of a single feedback device 10, 10' during the threshold protocol. The generally vertical arrow 56 represents a zero angle deflection between a user's arm 60 and the vertical force of gravity 58. The diagonally extending arrow 62 represents a deflection threshold angle, which determines triggering of an auditory or tactile cue from the feedback device 10, 10'. The arm 60, which is represented using solid lines, represents a first position of the arm of a user. As shown in FIG. 4, a feedback device 10 is provided on the wrist of the arm 60 of the user. During locomotion, the arm swing angles are monitored by the motion sensing means 40 (e.g., embedded accelerometers) of the feedback device 10, and then estimates of the arm swing angles are relayed to the central control unit 38 (e.g., internal circuitry) which controls the activation of either the audio signaling device 28 or the tactile signaling device 30. The arm 60', which is represented using dashed lines, represents a second position of the arm of a user. As shown in FIG. 4, the dashed arm 60' is generally disposed below the diagonally extending arrow 62, and thus, has failed to achieve the specified arm deflection. Because the dashed arm 60' has failed to achieve the specified arm deflection, no sensory cue is given to the user in this instance. In general, when the position of the user's arm lies within the diagonally hatched region 64 of FIG. 4, the user has failed to achieve the specified arm deflection, and therefore, no sensory cue will be given to the user when his or her arm is disposed in this region. The arm 60″, which is represented using center lines or a center linetype, represents a third position of the arm of a user. As depicted in FIG. 4, arm 60″ formed using center lines is generally disposed above the diagonally extending arrow 62, and thus, has successfully exceeded the threshold arm swing angle. Because the arm 60″ has successfully achieved the specified arm deflection, a sensory cue is given to the user by either the audio signaling device 28 or the tactile signaling device 30. In general, when the position of the user's arm lies within the cross-hatched region 66 of FIG. 4, the user has successfully achieved the specified arm deflection, and therefore, a sensory cue will be given to the user when his or her arm is disposed in this region by either the audio signaling device 28 or the tactile signaling device 30.

Figure 8:
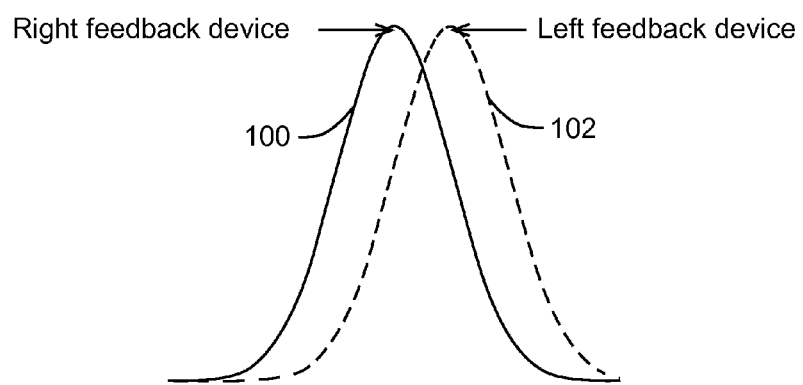
FIG. 8 is an exemplary graph that represents one illustrative manner in which inconsistencies between feedback devices located on right and left wrists of a user may be determined.

Now, another exemplary program protocol executed by the feedback devices 10, 10′ will be described with reference to FIG. 8. For this exemplary program protocol, feedback devices 10, 10′ are provided on each of the wrists of a user in order to determine inconsistencies between the right and left arm swings of the user. In other words, the motion of the right arm of the user is compared to that of the left arm. In general, the inconsistencies between the right and left arm swings of the user are detected in terms of the maximum forward arm swing displacements from each arm. Initially, using a baseline measurement, where the user holds his or her hands in a static position on his or her sides, predetermined or computed absolute angular displacements in the forward direction is specified for each device 10, 10′. If sensor readings from either one of the devices 10, 10′ show a persistent deficiency to this reference point and the magnitude of angular displacement of the other device, then these inconsistencies are used by the trailing arm to trigger the cueing mechanism(s) (i.e., to trigger the audio signaling device 28 and/or the tactile signaling device 30). In one or more embodiments, the means for comparing right and left arms of the user in order to determine a consistency of an arm swing between the right and left arms comprises a specially-programmed control unit or central control unit 38.

From the standardization or normalization process, two normally fitted curves 100, 102 (see FIG. 8) representing the distributions of a particular variable are stored for both feedback devices 10, 10′. One form of inconsistencies between the left and right device 10, 10′, is immediately achieved from comparing the two distributions for a particular outcome variable, such as arm swing pitch angle. The comparison informs the feedback devices 10, 10′ of which arm is normally achieving large arm swing amplitudes and by how much the lagging arm needs to increase its amplitude to be commensurate with the other arm. Inconsistencies of this nature are tracked during actual movement of the arms during locomotion, when using the static baseline from the self-calibration process, an absolute target reference angle is specified and the cueing systems on both arms are adjusted to activate only when the measured angle exceeds that target. If the cueing system of one of the devices 10 or 10′ is successfully turning on, while the other device 10 or 10′ is not turning on, that is another variable that is viewed as a measure of inconsistency between the arms.

For example, if a target angle from the reference of 15° is specified for forward arm swing (arm swing pitch angle), and the following 10 sample points were collected from both the left and right feedback devices 10, 10′ for arm swing pitch angle:

Right Feedback Device=[9°, 15°, 13°, 12°, 10°, 10°, 11°, 10°, 11°, 13°];
Left Feedback Device=[19°, 17°, 19°, 15°, 20°, 14°, 16°, 15°, 17°, 16°];

Clearly, as shown above, the left feedback device 10′ is achieving the desired angular displacement and promptly providing a cue to the user's left arm, while the right arm underperforms during the task.

Although the invention has been shown and described with respect to a certain embodiment or embodiments, it is apparent that this invention can be embodied in many different forms and that many other modifications and variations are possible without departing from the spirit and scope of this invention. Moreover, while reference is made throughout this disclosure to, for example, "an illustrative embodiment", "an exemplary embodiment", "one embodiment" or a "further embodiment", it is to be understood that some or all aspects of these various embodiments may be combined with another as part of an overall embodiment of the invention.

In addition, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A device configured to provide biofeedback on arm swing during walking, running, or other movement activities, the device comprising:
   a motion sensing means configured to sense the motion of an arm of a user during a movement activity and output one or more signals based upon the sensed arm motion;
   a computational means configured to compute an arm swing angle of the arm of the user using the one or more signals outputted by the motion sensing means;
   one or more signaling devices operatively coupled to the motion sensing means and the computational means, the one or more signaling devices configured to emit one or more signals to the user that are based upon the computed arm swing angle of the user so as to provide biofeedback to the user regarding arm swing; and
   means for comparing right and left arms of the user in order to determine a consistency of the arm swing between the right and left arms, and wherein the one or more signaling devices are further configured to emit one or more perceptible signals to the user when an inconsistency between the arm swing of the right and left arms exists.

2. The device according to claim 1, wherein the computational means is further configured to determine at least one of: (i) a speed of the arm of the user, (ii) a length of a swing arc of the arm of the user, (iii) a forward swing of the arm of the user, (iv) a backward swing of the arm of the user, and (v) a fluidity of movement of the arm of the user.

3. The device according to claim 1, wherein the motion sensing means comprises an inertial measurement unit that includes at least one of: (i) an accelerometer, (ii) a gyroscope, and (iii) a magnetometer.

4. The device according to claim 1, wherein the device is in the form of either a handheld device or a wearable device.

5. The device according to claim 4, wherein the device is in the form of a wearable device, and wherein the device further comprises attachment means for attaching the wearable device to a wrist of the user.

6. The device according to claim 5, wherein the attachment means comprises a strap or band formed using one or more extendable elastic materials.

7. The device according to claim 1, further comprising means for adjusting or tuning the device in order to accommodate a size or training needs of a particular user and/or different targeted arm motions of the user.

8. The device according to claim 1, wherein the one or more signals emitted by the one or more signaling devices are in the form of one or more of the following: (i) an audible signal, (ii) a vibratory signal or other type of tactile signal, and (iii) a visual signal.

9. The device according to claim 1, further comprising one or more program selection buttons configured to enable the user to selectively choose between a plurality of different precompiled programs loaded on the device.

10. The device according to claim 1, wherein at least one of the one or more signals emitted by the one or more signaling devices are configured to be detectable by a remote observer monitoring the arm swing of the user.

11. The device according to claim 1, further comprising data recording and storage means for recording and storing arm swing data acquired by the motion sensing means.

12. A device configured to provide biofeedback on arm swing during walking, running, or other movement activities, the device comprising:
    a motion sensing means configured to sense the motion of an arm of a user during a movement activity and output one or more signals based upon the sensed arm motion;
    a computational means configured to compute an arm swing angle of the arm of the user using the one or more signals outputted by the motion sensing means;
    a comparing means configured to compare the computed arm swing angle of the arm of the user to a predetermined threshold arm swing angle; and
    one or more signaling devices operatively coupled to the motion sensing means, the computational means, and the comparing means, the one or more signaling devices configured to emit one or more signals to the user and/or a remote observer that are based upon a comparison of the computed arm swing angle of the user to the predetermined threshold arm swing angle so as to provide biofeedback to the user regarding arm swing and/or arm swing assessment information to the remote observer;
    wherein, when the computed arm swing angle of the user is less than the predetermined threshold arm swing angle, the one or more signaling devices are configured to emit no signals to the user and/or the remote observer, and wherein, when the computed arm swing angle of the user is greater than the predetermined threshold arm swing angle, the one or more signaling devices are configured to emit one or more perceptible signals to the user and/or the remote observer.

13. The device according to claim 12, wherein the motion sensing means comprises an inertial measurement unit that includes at least two of the following: (i) an accelerometer, (ii) a gyroscope, and (iii) a magnetometer.

14. The device according to claim 12, wherein the computational means is in the form of a central processing unit of a central control unit, the central control unit being operatively coupled to the motion sensing means and the one or more signaling devices.

15. The device according to claim 12, wherein the one or more signaling devices comprise a first signaling device configured to emit a first type of signal and a second signaling device configured to emit a second type of signal, and wherein the device further comprises a selection switch or knob that is configured to enable the user to selectively choose between the first type of signal and the second type of signal or to activate both the first type of signal and the second type of signal.

16. The device according to claim 12, wherein the comparing means is further configured to compare the motion of the arm of the user to a predetermined arm swing path.

17. A system configured to provide biofeedback on arm swing during walking, running, or other movement activities, the system comprising:
    a first device configured to be coupled to a first arm of a user, the first device comprising a first motion sensing means configured to sense the motion of the first arm of the user during a movement activity and output one or more first signals based upon the sensed first arm motion, the first device further comprising a first computational means configured to compute a first arm swing angle of the first arm of the user using the one or more first signals outputted by the first motion sensing means; and
    a second device configured to be coupled to a second arm of the user, the second device comprising a second motion sensing means configured to sense the motion of the second arm of the user during the movement activity and output one or more second signals based upon the sensed second arm motion, the second device further comprising a second computational means configured to compute a second arm swing angle of the second arm of the user using the one or more second signals outputted by the second motion sensing means; and
    at least one signaling device operatively coupled to at least one of the first and second motion sensing means and to at least one of the first and second computational means, the at least one signaling device configured to emit one or more signals to the user that are based upon the computed arm swing angle of at least one of the first and second arms of the user so as to provide biofeedback to the user regarding arm swing;
    wherein the first device on the first arm of the user is configured to wirelessly communicate with the second device on the second arm of the user.

18. The system according to claim 17, further comprising means for comparing the motion of the first arm of the user to the motion of the second arm of the user.

19. The device according to claim 12, further comprising one or more program selection buttons configured to enable the user to selectively choose between a plurality of different precompiled programs loaded on the device, a first of the plurality of different precompiled programs configured to execute the comparison of the computed arm swing angle of the user to the predetermined threshold arm swing angle, and a second of the plurality of different precompiled programs configured to determine a consistency or inconsistency of the arm swing between the right and left arms of the user.

* * * * *